July 4, 1939.  F. P. KEIPER  2,164,865

CLUTCH CONTROL MECHANISM

Filed Nov. 2, 1931  2 Sheets-Sheet 1

Inventor
FRANCIS P. KEIPER
H. O. Clayton
Attorney

July 4, 1939.   F. P. KEIPER   2,164,865
CLUTCH CONTROL MECHANISM
Filed Nov. 2, 1931   2 Sheets-Sheet 2
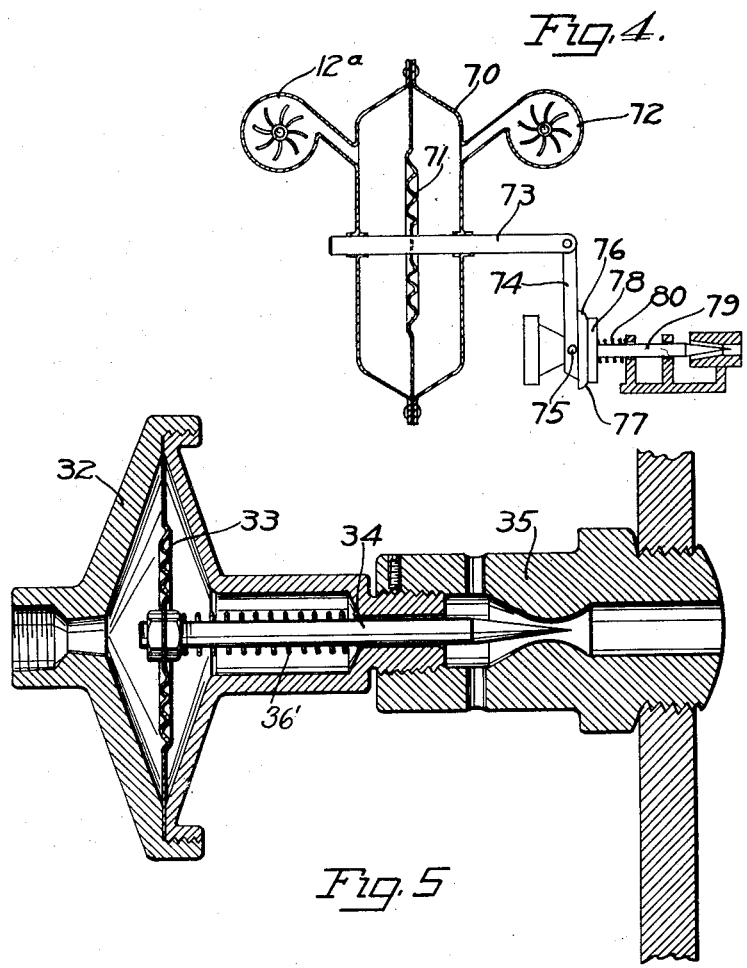
Inventor
FRANCIS P. KEIPER
by H. O. Clayton
Attorney Patented July 4, 1939

2,164,865

UNITED STATES PATENT OFFICE 2,164,865

CLUTCH CONTROL MECHANISM

Francis P. Keiper, Washington, D. C., assignor to Bendix Aviation Corporation, South Bend, Ind., a corporation of Delaware Application November 2, 1931, Serial No. 572,671

42 Claims. (Cl. 192—.01)

This invention relates to clutch mechanism, and more particularly to actuating means therefor.

It has heretofore been proposed to actuate the clutch of an automotive vehicle by the use of power actuated mechanism, in order to obviate the effort which must be expended in manually depressing the clutch pedal, and in maintaining the same in depressed position. One form of power actuating means heretofore utilized is constituted by a fluid motor, the piston of which actuates the clutch pedal, the said motor being usually energized by suction from the engine intake manifold, or by compressed air from a separate engine-driven compressor. The operation of the motor is usually controlled by a suitable valve mechanism, the controlling element of which may be connected to the accelerator pedal of the automotive vehicle in such a manner that upon closing the throttle the clutch is disengaged, and during initial aceleration of the engine the clutch is engaged. Such an arrangement permits coasting without the frictional drag of the engine, since the engine is disconnected from the drive shaft each time the throttle is closed. No difficulty arises in this mechanism in disengaging the clutch, but upon reengagement thereof severe strains, with an accompanying unpleasant bucking and jarring action, are set up, due to the necessary rapid transfer of kinetic energy of motion of the car to kinetic energy of rotation of the motor and its flywheel. This is true by virtue of the fact that the driving and driven members of the clutch are usually rotating at widely different speeds.

Difficulty has also been experienced with the aforementioned mechanism in starting the car from rest, inasmuch as the fluid motor must be so controlled as to permit the clutch to engage very slowly to obviate a jerking of the vehicle in getting under way.

It is accordingly one of the objects of the present invention to provide a construction of the above character so constituted as to avoid these difficulties.

Another object of the invention is to provide means which will regulate the rate of engagement of the clutch in accordance with the relative speed difference of the two clutch members to be engaged.

Still another object is to provide a clutch operating mechanism readily adaptable to the modern automotive internal combustion engine, which apparatus will at all times automatically operate the clutch in a proper manner in response to the operation of the throttle or any readily operable manual control by which the apparatus may be controlled.

A further object is to provide a novel mechanism which affords rapid disengagement of the clutch, and rapid movement of the movable element thereof during the engagement movement, except during the portion of the engagement stroke wherein the clutch is actually in the process of engaging.

Another object is to provide, in a mechanism such as that indicated above, novel speed responsive mechanism for controlling the exhaust port of the clutch actuating power motor and to thus regulate the rate of movement of the piston during the clutch engaging operation, in order to secure efficient and smooth engagement of the clutch members under all conditions of operation; to this end there is suggested a double ended fluid motor having a piston or equivalent member operably connected to the driving clutch member, the movement of the piston being controlled by one valve controlling the gaseous pressure within one end of the motor to initiate the clutch disengaging and engaging operations of the motor, the piston movement being further controlled by other valve mechanism controlling the gaseous pressure within the other end of the motor to regulate the engagement of the clutch; the first mentioned valve mechanism is preferably of the three-way or dump type and manually operated, whereas the second mentioned valve mechanism is preferably of the metering or bleed type and is operated either by means connected to the driven clutch member or by means interconnecting both of the clutch members.

A still further object is to provide a novel mechanism adapted to control the rate of engagement of the clutch in accordance with the speed of the driving clutch member.

The above and other novel features of the invention will appear more fully hereinafter from the following detailed description when taken in connection with the accompanying drawings. It is to be expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Figure 4 is a diagrammatic view illustrating another form of differentially operating apparatus;

Figure 5 is a section showing a perferred construction of the metering or relief valve, diagrammatically shown in Figure 3.

Figure 1:
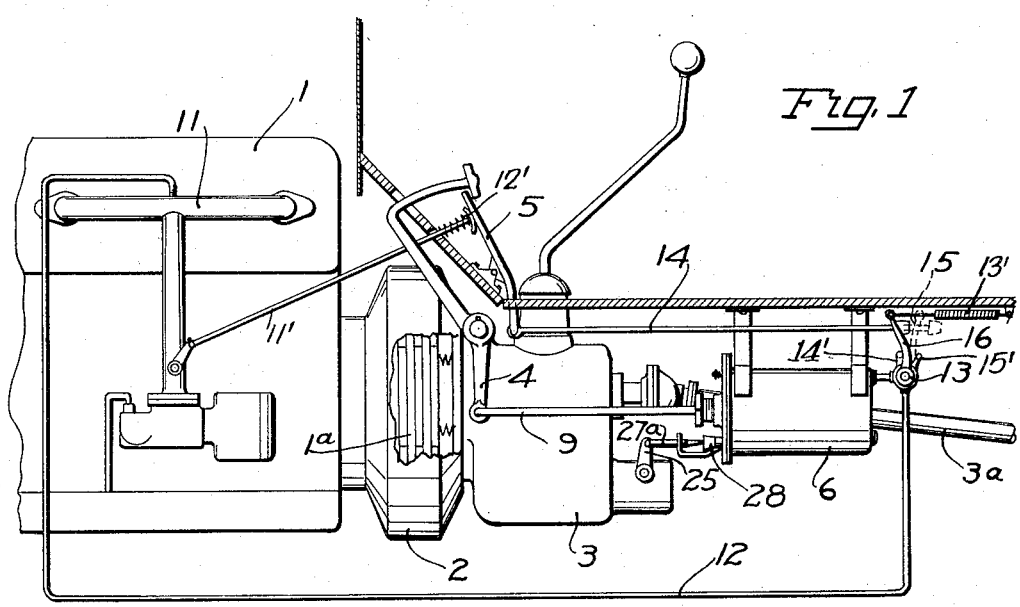
Figure 1 is a side elevation of an automotive vehicle internal combustion engine and transmission having the present invention embodied therein.
Figure 2:
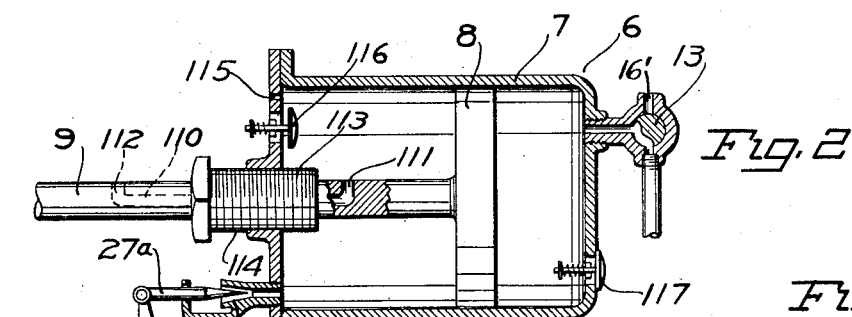
Figure 2 is an enlarged vertical axial section of the clutch power actuating mechanism.

Referring to the drawings and more particularly to Figures 1 and 2 thereof, a portion of an automotive vehicle embodying the present invention is illustrated therein as comprising an internal combustion engine 1 having a clutch 1a enclosed within the casing 2, the usual transmission gear housing 3, and driven shaft 3a. The clutch comprises the usual driving and driven members connected respectively to the engine and transmission, said members being normally urged into driving contact by the usual clutch spring.

For the purpose of actuating the clutch by power, a power actuator 6 adapted to be operated by vacuum from the engine intake manifold is provided. In the embodiment shown, such actuator includes a cylinder 7 and a piston 8 therein, the said piston being preferably pivotally connected by means of piston rod 9 to a clutch pedal lever 4. As shown, the source of vacuum for operating the power actuator 6 is obtained from the intake manifold 11 of the internal combustion engine 1, the connection between the manifold and actuator being had by means of a tube 12 and controlled by a valve 13.

To facilitate the operation of the power actuating means, it is preferable to operate the same from the acelerator or throttle actuating member 5 in such a manner that during closed throttle the clutch is disengaged, and upon opening the throttle, the clutch is engaged, since upon opening of the engine throttle power is developed for transmission which may be utilized only through an engaged clutch. Accordingly, a link 14 is provided to operate the valve 13 and this link is connected to the operating member of the valve through a slip connection 15 at one end, and connected to the accelerator member 5 at the other. The member 5 is connected to a throttle operating link 11', the link being urged to throttle closed position by a return spring 12'.

It will be observed that to disengage the clutch it is necessary to connect the power cylinder with the intake manifold to provide suction which will draw the piston to the right, as viewed in Figure 2, and thus disengage the clutch against the action of the usual clutch return spring, not shown. To reengage the clutch, the cylinder is connected to atmosphere, the suction from the manifold being cut off, the clutch return spring then effecting engagement of the clutch in the usual manner. To accomplish this the valve 13 has two positions, one of which connects the cylinder to atmosphere while the other connects the cylinder to the suction line, the last position of the valve being indicated in Figures 1 and 2. The link 14 is so designed that with the closing of the throttle by the accelerator the valve 13 is positioned as shown in Figure 2; that is, in such a position as to evacuate the cylinder 7. Upon a slight movement of the accelerator pedal toward the open throttle position, this valve is rotated so as to connect the cylinder to atmosphere, and substantially simultaneously opens the throttle, the slip connection 15 permitting the link 14 to slide freely through the aperture in the valve lever 16 upon further movement of the accelerator pedal. With the accelerator released the spring 12' acts to move the link 14 to the left, a head on the end thereof contacting the lever 16 to move the same counterclockwise against the action of spring 13'. The lever is connected to a valve member 13, moving the latter to a position to interconnect the manifold and cylinder 7. When the accelerator is depressed to open the throttle, the spring 13' acts to rotate the lever 16 to move the valve member 13 to its position to vent the cylinder 7 to atmosphere via a port 16'. Stops 14' and 15' serve to limit the movement of the valve member.

Should the vehicle be travelling under its own momentum with closed throttle, that is with accelerator pedal in retracted or off position, the clutch will immediately be disengaged since suction would be admitted to the cylinder. Under these circumstances the engine will slow down to idling speed and the vehicle will travel freely under its own momentum, gathering speed or losing speed depending upon the grade. Should the operator, under these conditions, choose to apply motive power to the car, it is merely necessary to depress the accelerator, whereupon the clutch will be immediately reengaged, since the suction is then disconnected from the power actuator and the latter is connected to atmosphere by means of the valve 13.

In the event that the vehicle is travelling at a high rate of speed during this operation, the substantially high R. P. M. of the driven clutch plate will cause a severe strain on the parts and a severe jerking or bucking action, since the engine must be rapidly accelerated to the car speed during the period of clutch engagement. To lessen or eliminate this strain and bucking effect, it is proposed to provide means for varying the length of the period of the clutch engaging operation in accordance with either the speed of the driven clutch member or the relative speeds of the driving and driven clutch members, such means operating to effect smooth clutch operation under all circumstances.

For this purpose, there may be provided a governor mechanism driven by the driven clutch plate plate of the vehicle, the said mechanism actuating a metering or bleed valve in the power cylinder so as to regulate the rate of change of gaseous pressure within the latter and hence the speed at which the piston may move and the clutch may engage. As shown in Figure 2, such governor mechanism is preferably centrifugally operated and includes a disc weight 20 pivotally mounted upon a shaft 22, which may be drivably connected to the driven clutch member in any suitable manner, and normally maintained in the position shown by a spring 21. A collar 23 having an arm 24 connected with the disc is slidably keyed to the shaft 22 and is provided with an annular groove 26 adapted to receive one end of a lever 25, suitably pivotally mounted upon a stationary casing 27, the other end of said lever being pivotally connected to a metering or bleed valve 27a cooperating with a valve casing 28 secured in one end of the power cylinder 7. Preferably the shaft 22 is positively connected to the driven clutch plate in such a manner as to be unaffected by the change speed gearing in the transmission.

From this construction it will be apparent that upon an increase in speed of shaft 22, the disc 20 due to centrifugal force tends to arrange itself at right angles to the shaft axis, thus shifting the collar 23 and reducing the opening of valve 27ª. The reduction of the opening of this valve decreases the rate at which air may exhaust from the left-hand end of the cylinder during movement of the piston 8 toward the lft, as viewed in Figure 2, and accordingly regulates the rate of motion of the piston during the engaging operation of the clutch. It will also be apparent that, if, during engagement of the clutch, deceleration of the vehicle should take place at too great a rate or in a jerky manner, the action of element 23, due to its inertia, will influence disk 20 to move the latter counterclockwise in the same manner as described above. This action results in a closing of the bleed valve 27ª, thus improving the operation of the engagement of the clutch.

Figure 3:
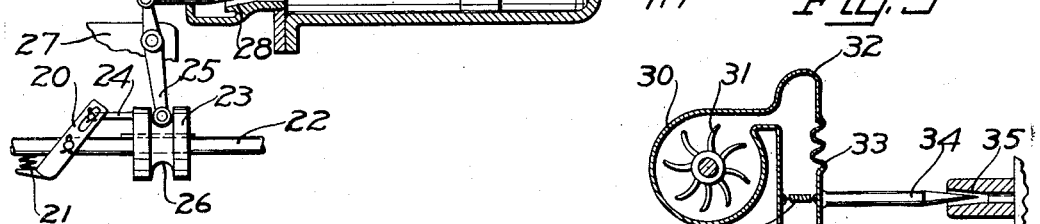
Figure 3 is a diagrammatic sectional view of a modified valve mechanism which may be employed with clutch power actuating mechanism.

A modified form of metering or relief valve structure, which may be employed in connection with the power actuator, is illustrated in Figures 3 and 5. As shown in Figure 3, such valve structure comprises a small air turbine 30 having an impeller 31 which may be driven in any suitable manner by the clutch driven member, and is connected to a closed shell 32 having a flexible diaphragm 33 positioned across the open end thereof. Connected with the diaphragm 33 is a metering valve 34 which cooperates with the valve casing 35 secured to the cylinder of the power actuator in a manner similar to that described in connection with the metering valve of Figure 2. During the operation of this form of the invention, the turbine develops a static pressure proportional to the speed of the impeller and hence the driven clutch member, which static pressure urges the metering valve into the valve casing, a distance proportional to the pressure developed. Thus the degree of valve opening or closing is regulated by the speed of the vehicle, or clutch driven member. The diaphragm is biased to its normal position by a return spring 35' in Figure 3 and by a spring 36' in Figure 5.

Figure 6:
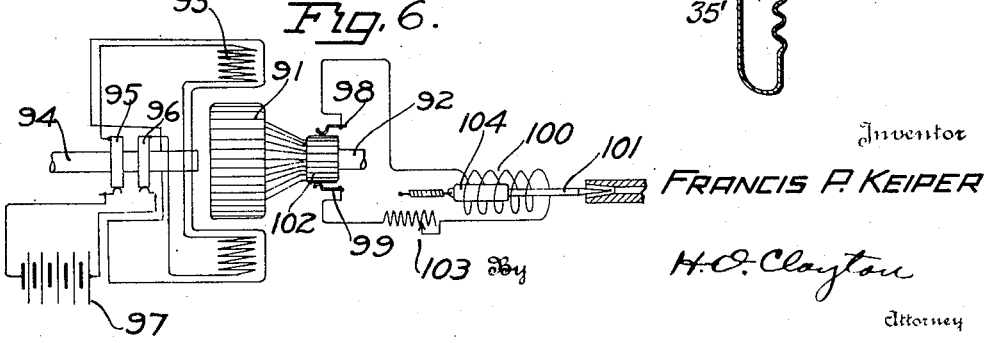
Figure 6 is a diagrammatic view of an electrical differential arrangement for operating the relief valve.

It may be desirable in certain instances to control the position of the metering or bleed valve associated with the power actuator by means dependent upon the difference between the speeds of the driving and driven clutch members in order to provide smooth engagement of the clutch under all conditions, especially during acceleration of the vehicle from rest. Means operable to effect such result are illustrated in Figures 4 and 6.

Referring more particularly to the modification of Figure 4 the metering valve is operated by a diaphragm, the latter in turn being operated by two turbines driven by the clutch members. The arrangement is such that one of the turbines is driven by each clutch member to develop a degree of static pressure on each side of the diaphragm, the mechanism being calibrated to thereby operate the metering valve in accordance with the degree of difference in R. P. M. of the two clutch members. As disclosed in the drawings, there is provided a shell 70 comprising two compartments separated by a diaphragm 71. A turbine 72, drivably connected to the driven clutch member in any suitable manner, may operate to develop static pressure on one side of the diaphragm, while a similar turbine 12ª, drivably connected with the driving clutch member, may be connected to the other side of the diaphragm. The diaphragm 71 is fixed to the rod 73 which has rectilinear motion, upon movement of the diaphragm, thus rocking a lever 74 about a fixed pivot 75. Carried by the lever 74 is a cam plate having upper and lower cam surfaces 76 and 77, which engages a follower plate 78 fixed to a metering valve 79. A coil spring 80 maintains the follower in engagement with the cam. From the foregoing, it will be readily understood that upon movement of the rod 73 in response to unequal pressures on the diaphragm, the lever 74 will rock the cam, so one or the other of surfaces 76 or 77 will engage and drive the follower 78 toward the right, as viewed in Figure 5, thus partially closing off the metering or relief valve 79. Since two cam surfaces are provided, it will be appreciated that movement of the diaphragm in either direction produces the same effect upon the valve. The valve and governor parts are preferably so constructed and arranged that a maximum opening of the valve is insured when and if the diaphragm pressure differential is zero.

In order to accomplish the same differential effect by electrical apparatus, a generator may be provided wherein both field and armature may rotate, one being rotated by the driving clutch member and the other by the driven clutch member. As shown diagrammatically in Figure 6, an armature 91 is driven through a shaft 92 by suitable gearing or flexible shafting connected to one clutch member and field 93 is rotated similarly by the other clutch member through a shaft 94 and suitable connections, not shown. Slip rings 95 and 96 are employed to energize the field by the usual car battery 97. Brushes 98 and 99 cooperate with a commutator 102 to collect any generated current and deliver the same to a solenoid 100, which when energized is effective to draw a core 104 toward the right, as viewed in this figure, such movement of the core being effective to move metering valve 101 so as to reduce the valve opening. A suitable adjustable resistance 103 may be placed in the circuit to regulate the degree of pull of the solenoid. In operation, it will readily be seen that when the field and armature rotate together at the same speed, no current will be generated, and the parts will be maintained in the position shown in this figure. When, however, a difference in speed occurs, an electromotive force is generated, proportional to the speed difference, which will cause a likewise proportional current to flow through the solenoid, thus energizing the latter and varying the closing of the valve 101 in an amount proportional to such current.

Returning to the cylinder construction, illustrated in Figure 2, in order to provide for rapid movement of the clutch to such a position that the clutch members will be lightly initially engaged, an axial bore 110 with radial outlets 111 and 112 is provide in the piston rod 9, so that air may escape rapidly until the port 111 becomes covered by the bushing or sleeve 113. This sleeve is provided with a screw thread 114 so that it may be adjusted axially to vary the cut off time, thus providing for rapid initial movement of the clutch to the aforesaid position, but regulating all further movement by the valve 28. In this connection, it will be observed that a small minimum opening such as 115 may be provided to fix the lowest rate of movement possible or desirable after the outlet 111 has been covered by the bushing 113. Check valves 116 and 117 are provided so that manual movement of the clutch pedal will not be interfered with.

There is thus provided a pressure differential operated power mechanism operative to so control the disengagement and the engagement of the clutch as to accurately simulate a conventional manual operation thereof. In operation, the clutch plates are first rapidly moved up to the point of contact, whereupon the movement is appreciably retarded in order to effect the driving contact. In starting the vehicle the engaging movement is relatively slow and in proportion to the speed of the driving clutch plate, and after the vehicle is under way the mode of engagement is determined either by the speed differential of the driving and driven plates or solely in accordance with the speed of the driven clutch plate, depending upon the embodiment of the invention employed. Thus with a high differential, as after a free-wheeling operation in high gear, the rate of engagement, that is, the cushioning or clutch plate contacting engagement, is relatively slow, thereby insuring a sufficient delay during the engaging operation to enable the R. P. M. of the driving clutch plate to come up to that of the driven plate.

A smooth engagement of the clutch is thus obtained both in starting, during the gear shifting operations, and after a free-wheeling operation. Such smooth engagement is obtained by so limiting the acceleration and deceleration of the vehicle as to obviate a jerking action either in starting the car wherein the engine picks up the vehicle as a load or after the car is in motion when the condition is often such that the vehicle picks up the load of the engine. The rate of engagement, determined by the rate of efflux of air from the cylinder 7 via port 115 and valve 27ª, determines the rate of change of clutch plate loading under the action of the clutch springs. With a given loading there results a given acceleration; the rate of change of loading therefore determines the rate of change of acceleration. It follows therefore that during the engagement of the clutch the factor of acceleration should at all times be kept below that which would be undesirable both as it affects the comfort of the passenger and the condition of the vehicle. With the instant invention this result is insured, the loading of the clutch plates and consequently either the acceleration or the deceleration of the vehicle being controlled at all times.

Though several embodiments and modifications of the invention have been illustrated and described, it is to be understood that the invention is not limited thereto but may be embodied in various mechanical and electrical forms. For example, the manner of driving the differential elements or governor elements may be varied as may best suit the circumstances. As such changes in the construction and arrangements of parts may be made without departing from the spirit of the invention, as will be apparent to those skilled in the art, reference will be had to the appended claims for a definition of the limits of the invention.

What is claimed is:

1. In an automotive vehicle having a driving engine and a transmission, a friction clutch interposed between said transmission and engine, a fluid pressure power actuator for operating said clutch, means for initiating the clutch engaging and disengaging operations of said actuator, and other means associated with said driving engine and said transmission operable to vary the operation of the actuator in accordance with the relative modes of operation of said driving engine and transmission in order to vary the rate of engagement of the clutch.

2. In an automotive vehicle having a source of power and a driven member, a friction clutch interposed between said source of power and said member, power driven actuating means for operating said clutch, and means associated with said actuating means and said driven member to vary the rate of operation of said actuating means in accordance with changes in speed of said driven member.

3. In an automotive vehicle having a driving member and a driven member, a clutch interposed between said driving member and said driven member, vacuum operable actuating means for controlling said clutch, and means responsive to the speed of said driven member for controlling the rate of operation of said actuating means.

4. In an automotive vehicle having a driving engine and a driven member, a friction clutch interposed between said engine and said member, an accelerator for the engine, vacuum operable actuating means for disengaging said clutch, said actuating means being controlled by movement of said accelerator, said vacuum operable actuating means being provided with valve means responsive to the speed of the driven member, for controlling the rate of engagement of the clutch.

5. The combination with an internal combustion engine, of a driven member, a friction clutch interposed between said engine and said member, an accelerator for the engine, vacuum operable actuating means for controlling said clutch, said actuating means including a movable element controlled by movement of said accelerator, and means responsive to the speed of the driven member and including a valve associated with said actuating means for controlling the rate of movement of the movable element during the clutch engaging operation.

6. The combination with an internal combustion engine, of a driven member, a friction clutch interposed between said engine and said member, an accelerator for the engine, vacuum operable actuating means for controlling said clutch, said actuating means being controlled by movement of said accelerator, a centrifugally responsive device drivably connected to the driven member, and a valve associated with said device and said actuating means for controlling the operation of the latter during the clutch engaging operation, the position of said valve being determined by movement of said centrifugally responsive device.

7. The combination with an internal combustion engine having a throttle controlled intake manifold and a driven member, of a clutch interposed between said engine and member, a vacuum cylinder, a piston in said cylinder operatively connected with the clutch, a conduit connecting one end of the cylinder with the intake manifold, a valve in said conduit, said valve being controlled in conjunction with the throttle, a valve associated with the other end of said cylinder, and means comprising a device responsive to the speed of said driven member for controlling said last-named valve.

8. In a clutch operating mechanism for a friction clutch having driving and driven members, means for engaging said clutch, and means for decreasing the rate of engagement of said clutch upon an increase of difference between the speeds of the driving and driven members.

9. In a clutch operating mechanism having a clutch comprising driving and driven members, resilient means maintaining the clutch normally engaged, a cylinder, a piston therein, means connecting said piston with said clutch, means for admitting vacuum to one end of the cylinder to move said piston and disengage said clutch, and means for varying the communication between the other end of the cylinder and the atmosphere in accordance with the relative speed of the driving and driven members to vary the rate of engagement of the clutch upon a release of said vacuum.

10. A friction clutch comprising driving and driven members, operating mechanism connecting said clutch with a piston and cylinder, means for preventing the too rapid engagement of said clutch comprising a variable aperture in said cylinder, and means responsive to an increase in the relative speed of the driving and driven members for controlling said aperture.

11. In combination with a clutch having driving and driven members, power means associated with one of said members to control the movement thereof into and out of engagement with respect to the other of said members, and means for causing irregular movement of said power means to effect a two-stage engagement between the driving and driven members, said last-named means including a device controlled by the speed of rotation of the driven member to determine the last stage of movement of the driving clutch member.

12. In an automotive vehicle having an internal combustion engine and driven mechanism, a clutch therebetween, an accelerator, means for controlling said clutch comprising a power cylinder, a piston therein, means for connecting one end of said cylinder to the intake manifold of the engine, a valve in said last-named means controlled by said accelerator, and means for connecting the other end of said cylinder to atmosphere including a vent controlled by said piston, and a valve controlled by the speed of said driven mechanism.

13. In an automotive vehicle having an engine and driven mechanism, a clutch therebetween, said clutch being normally engaged, a power cylinder, a piston therein, said piston being operatively connected with said clutch, vacuum controlled connections for imparting movement to said piston in one direction to disengage said clutch, and means for irregularly controlling movement of said piston in the return direction to engage said clutch, said means including a valve controlled vent, and means responsive to the speed of the driven mechanism for controlling the position of said valve.

14. In an automotive vehicle having an engine and a driven member, a friction clutch interposed between said engine and said member, an accelerator for said engine, power operable means for controlling said clutch, said means being controlled by movement of said accelerator, and electrically operable means responsive to the speed of the driven member for controlling the movement of said power means during engaging movement of the clutch.

15. The combination with an internal combustion engine having a throttle controlled intake manifold, a driven member, a clutch interposed between said engine and member, vacuum operable means for controlling said clutch, means including a valve for connecting said vacuum operable means with said manifold, said valve being controlled in conjunction with said throttle, and means including fluid pressure operated mechanism dependent upon the difference in speed between said engine and driven member for controlling said vacuum operable means during engagement of said clutch.

16. In an automotive vehicle having a friction clutch including driving and driven members, a clutch operating mechanism comprising a source of fluid pressure, a fluid pressure motor operably connected with the clutch, and a control valve for said motor, and means for regulating the rate of clutch engagement in accordance with the relative speed of the driving and driven members.

17. In a clutch operating mechanism having a clutch comprising driving and driven members, resilient means maintaining the clutch normally engaged, a fluid pressure motor, means connecting said fluid pressure motor with said clutch to control the operation thereof, means for admitting fluid pressure to said fluid motor to disengage said clutch, and means for varying communication between said fluid motor and atmosphere, in accordance with the relative speed of the driving and driven members to vary the rate of engagement of said clutch and return movement of said fluid motor.

18. In an automotive vehicle having an internal combustion engine and driven mechanism, a clutch therebetween, an accelerator, means for controlling said clutch comprising a power cylinder, a piston therein, means for connecting one end of said cylinder to the intake manifold of the engine, a valve in said last-named means controlled by said accelerator, and means for connecting the other end of said cylinder to atmosphere including a vent controlled by said piston, and a valve controlled by the differential speed between the engine and driven mechanism.

19. In an automotive vehicle provided with an engine, a transmission, and a clutch for interconnecting the two to drive the vehicle, said clutch comprising driving and driven members, vacuum operated power means for operating said clutch, and means for progressively varying the clutch engaging operation of said power means in accordance with the speed of movement of one of said clutch members.

20. In an automotive vehicle provided with an engine, a transmission, and a clutch for interconnecting the two to drive the vehicle, said clutch comprising driving and driven members, vacuum operated power means for operating said clutch, and means for progressively varying the clutch engaging operation of said power means in accordance with the differential operation of said clutch members.

21. In an automotive vehicle provided with an engine, a transmission, and a clutch for interengaging the two to drive the vehicle, said clutch comprising driving and driven members, a pressure differential operated motor operably connected to the clutch to control the operation thereof, and means, operable in accordance with the speed of one of the clutch members, for determining the gaseous pressure within said motor to thereby vary the rate of clutch engaging movement of the driven clutch member.

22. In an automotive vehicle provided with an engine, a transmission, and a clutch, said clutch comprising driving and driven members, a pressure differential operated fluid motor operably connected to the clutch to control the operation thereof, and valve means, operable in accordance with the speed of but one of the clutch members, for varying the rate of clutch engaging operation of said fluid motor.

23. In an automotive vehicle provided with an engine, a transmission, and a clutch, said clutch comprising driving and driven members, a pressure differential operated fluid motor operably connected to the clutch to control the operation thereof, and valvular means, operable in accordance with the differential in speed between the aforementioned clutch members, for determining the gaseous pressure within said motor to thereby determine the rate of clutch engaging movement of the driven clutch member.

24. In an automotive vehicle provided with an engine, a transmission, and a clutch for interengaging the two to drive the vehicle, said clutch comprising driving and driven members, a double-ended vacuum operated motor operably connected with the clutch, and means, operable in accordance with the speed of one of the clutch members, for determining the gaseous pressure within a portion of said double-ended motor to thereby determine the rate of clutch engaging movement of one of the clutch members.

25. In an automotive vehicle provided with an engine, a transmission, and a clutch for interengaging the two to drive the vehicle, said clutch comprising driving and driven members, a double-ended vacuum operated motor operably connected with the clutch, and means comprising a needle valve having fixed and movable parts, the fixed part being connected to the motor and the movable part being operatively connected to means driven by one of the clutch members, said valve being operable in accordance with the speed of said clutch member for determining the gaseous pressure within a portion of said double-ended motor to thereby determine the rate of clutch engaging movement of the driven clutch member.

26. The combination with an internal combustion engine, of a driven member, a friction clutch interposed between said engine and said member, an accelerator for the engine, vacuum operable actuating means for controlling said clutch, said actuating means including a movable element controlled by movement of said accelerator, and means responsive to the speed of the driven member while the driving member rotates at a constant speed and including a valve associated with said actuating means for controlling the rate of movement of the movable element during the clutch engaging operation.

27. In an automotive vehicle having an engine and a transmission, a clutch for connecting said engine with said transmission, said clutch comprising relatively movable driving and driven members, and means, responsive to the difference in speed of the clutch members, for controlling the rate of engagement of said clutch.

28. In combination with an automotive vehicle having an engine, clutch and transmission, said clutch comprising relatively movable driving and driven members, power driven actuating means for controlling said clutch, and means associated with said engine and transmission and responsive to the difference in speed of the clutch members for varying the rate of engagement of said clutch.

29. In an automotive vehicle comprising a friction clutch including driving and driven members and a spring for urging the same into engagement one with another, a clutch operating mechanism comprising a cylinder and a piston adapted to be actuated by fluid pressure, means connecting said piston with said clutch whereby movement of the piston effects a disengagement of said clutch, and means for regulating the rate of change of load of the clutch spring and thereby regulating the engagement of the clutch, said latter means being operative in accordance with the relative speed of the driving and driven members of the clutch.

30. In an automotive vehicle having a clutch and a driving part whose speed is directly proportional to the vehicle speed, means for actuating the clutch, means for controlling said means for actuating said clutch, and means controlled by the speed of the driving part and connecting said second named means thereto whereby said second named means controls said actuating means to correlate the speed of the clutch actuating means to the speed of the driving part.

31. In an automotive vehicle having a clutch and a driving part whose speed is directly proportional to the speed of the vehicle, clutch actuating means of the fluid pressure type and having a valve member controlling operation thereof, a valve member whose position determines the speed of clutch actuation, and means controlled by the speed of the driving part and operatively connecting said second named valve member thereto so as to correlate the position of the valve to the speed of the driving part.

32. In an automotive vehicle having a clutch and a driving part whose speed is directly proportional to the vehicle speed, means for actuating the clutch, a valve for controlling said means for actuating said clutch, and a governor means controlled by the speed of the driving part and means operatively connecting said valve to said governor means whereby said valve controls said means for actuating said clutch to correlate the speed of the clutch actuating means to the speed of the driving part.

33. In a automotive vehicle having a clutch and a driving part whose speed is directly proportional to the speed of the vehicle, clutch actuating means of the fluid pressure type and having a valve controlling actuation thereof, a variable member whose position determines the speed of clutch actuation, and a governor means controlled by the speed of the driving part and operatively connecting the variable member thereto so as to correlate the position of the latter to the speed of the driving part.

34. In a automotive vehicle having a clutch and a driving part whose speed is directly proportional to the speed of the vehicle, clutch actuating means of the fluid pressure type, a valve for controlling said clutch actuating means, a member whose position determines the speed of clutch actuation, and means controlled by the speed of the driving part and operatively connecting the member thereto so as to correlate the position of the member to the speed of the driving part.

35. The combination with an automobile clutch and a driving part adapted to be connected to the wheels of the automobile, of means for actuating said clutch, personally operable means for controlling said means for actuating said clutch, means for varying the rate of operation of said means for actuating said clutch, and speed sensitive means operatively connected to said driving part and to said means for varying the rate of operation of said clutch actuating means.

36. The combination with an automobile clutch and a driving part adapted to be connected to the wheels of the automobile, of fluid pressure means for actuating said clutch, a valve for controlling said fluid pressure means, a variable valve for controlling the rate of operation of said fluid pressure means, and speed sensitive means operatively connected to said driving part and to said valve for controlling the rate of actuation of said fluid pressure means.

37. In an automotive vehicle, a clutch and a driving part whose speed corresponds to that of the vehicle, clutch actuating means, a valve controlling said clutch actuating means, a manipulator connected to said valve, means for varying the rate of operation of said clutch actuating means, and speed sensitive means connected to said driving part and to said means for varying the rate of operation of said clutch actuating means for correlating the rate of operation of the latter to the rate of operation of said driving part.

38. Clutch control mechanism for an automotive vehicle provided with a clutch having driving and driven elements, power means for operating the driven clutch element to control the engagement and disengagement of the clutch, said power means including a valve operable to initiate the clutch disengaging and engaging operations of said means and further comprising automatically operable means for controlling the clutch engaging operation of said power means comprising a fluid pump drivably connected to the driving element of the clutch, a second fluid pump drivably connected to the driven element of the clutch, and fluid operated bleed valve means controlled by said pumps for controlling the rate of movement of one of the clutch elements as the clutch is being engaged.

39. In an automotive vehicle provided with a clutch, a pressure differential operated clutch operating motor, valve mechanism for controlling the operation of said motor, centrifugally operated means, operative as a result of the inertia of said means, for controlling the valve mechanism during the clutch engaging operation of the motor.

40. In an automotive vehicle provided with a clutch having driving and driven members, power means for operating the clutch comprising a combined governor and bleed valve unit, said unit including means, operable in accordance with the difference in speeds of said clutch members, when the speed of the driven clutch member exceeds that of the driving member, for controlling the clutch engaging operation of said power means.

41. In an automotive vehicle provided with a clutch having driving and driven elements, power means for operating the clutch including a bleed valve for controlling the clutch engaging operation of said power means, and means for operating said bleed valve comprising means operative in accordance with the difference in speeds of said clutch elements.

42. In an automotive vehicle provided with a clutch having driving and driven elements, power means for operating the clutch including a bleed valve for controlling the clutch engaging operation of said power means, and means for operating said bleed valve comprising means operative in accordance with the difference in speeds of said clutch elements, said last mentioned means including a governor, one element of which is drivably connected with the said driven clutch element and another element of which is drivably connected with the driving clutch element.

FRANCIS P. KEIPER.